Figure 1:
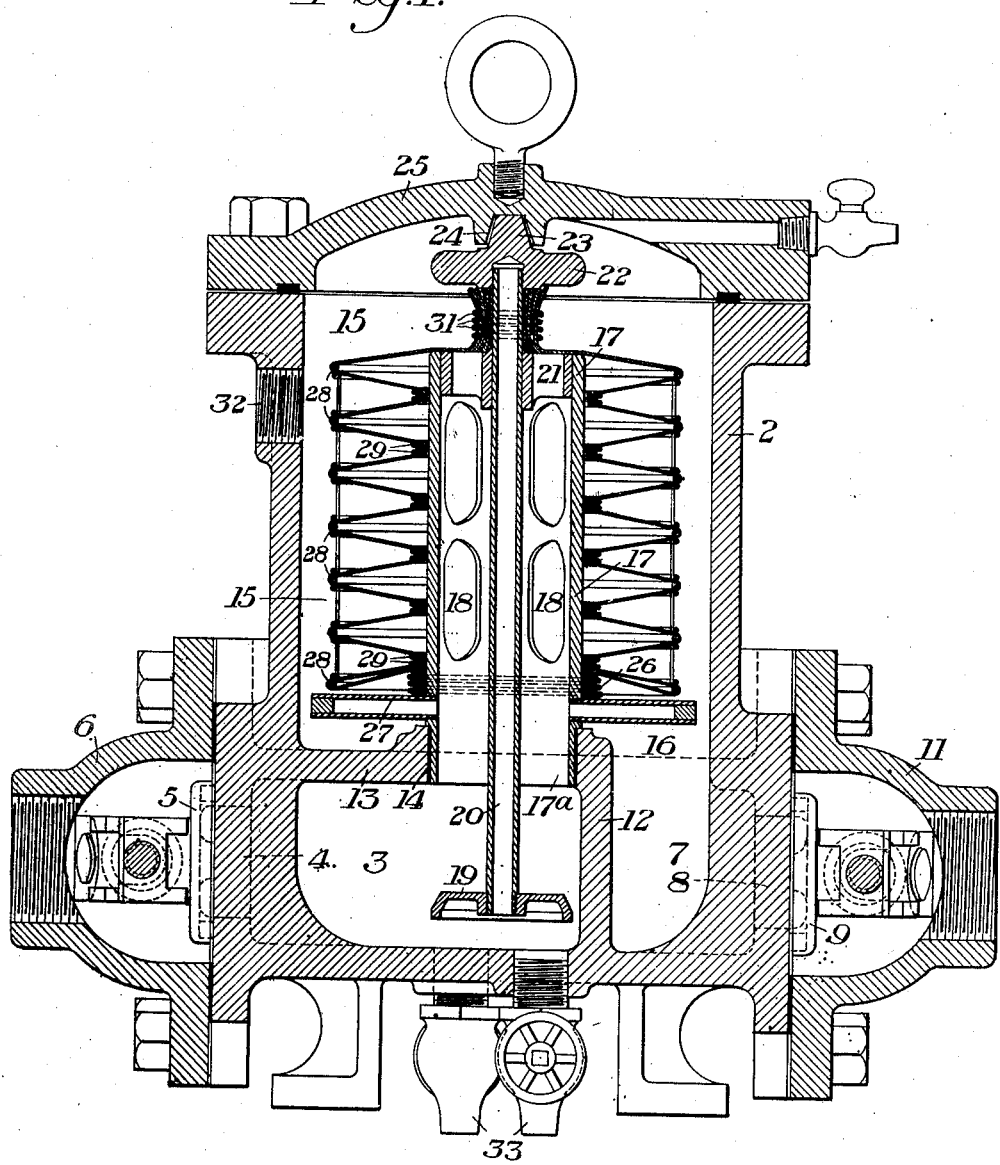

W. S. ELLIOTT.
FILTER.
APPLICATION FILED FEB. 3, 1912.

1,058,737.

Patented Apr. 15, 1913.
2 SHEETS—SHEET 1.

WITNESSES

INVENTOR

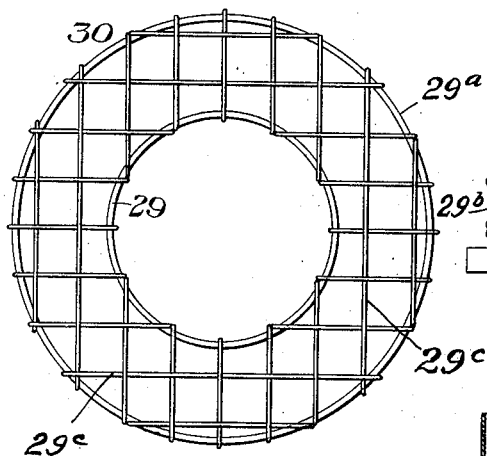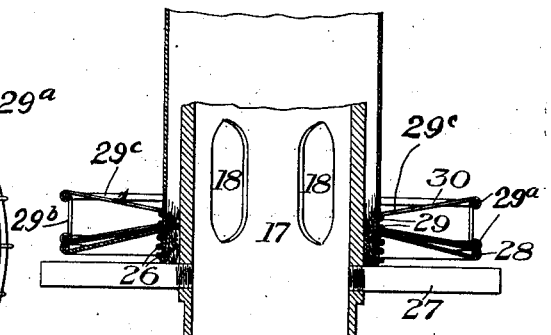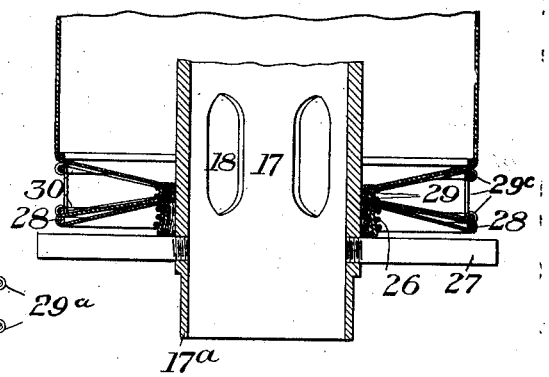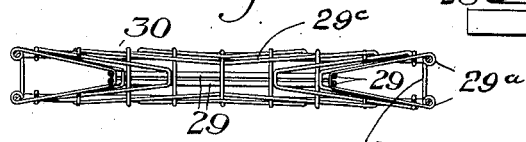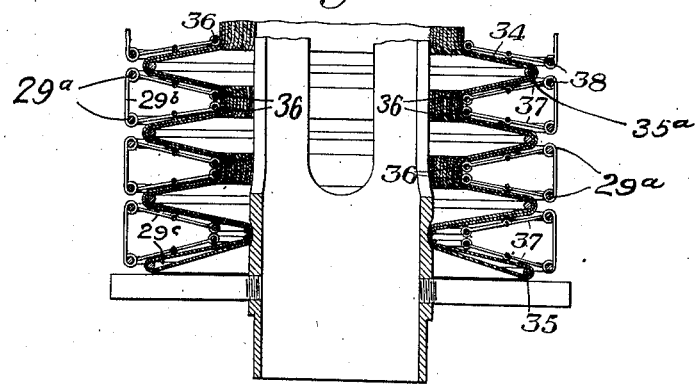

UNITED STATES PATENT OFFICE.

WILLIAM S. ELLIOTT, OF PITTSBURGH, PENNSYLVANIA.

FILTER.

1,058,737.   Specification of Letters Patent.   Patented Apr. 15, 1913.

Application filed February 3, 1912. Serial No. 675,311.

*To all whom it may concern:*

Be it known that I, WILLIAM S. ELLIOTT, of Pittsburgh, Allegheny county, Pennsylvania, have invented a new and useful Improvement in Filters, of which the following is a full, clear, and exact description, reference being had to the accompanying drawings, forming part of this specification.

My invention has relation to filters; and is designed to provide a filter element, or bag, of novel character and construction, having a large amount of filter area; also to provide means of simple and convenient character whereby the filter element of the bag may be readily removed from the filter chamber for cleaning or renewal.

The present application is related to my pending application No. 569,082, filed June 27th, 1910, being in part for subject-matter divided out of that application.

The nature of my invention will be best understood by reference to the accompanying drawing, which will now be described, it being premised, however, that the invention is susceptible of various other embodiments, and that it may be changed in various ways within the scope of the appended claims.

In the accompanying drawings, forming part of this specification, Figure 1 is a vertical section of one form of filter embodying my invention; Fig. 2 is a plan view of one of the cages or rings; Fig. 3 is a side view of the same; Figs. 4 and 5 are fragmentary sectional views showing two different steps in the operation of forming the filter bag; and Fig. 6 is a fragmentary sectional view showing a modified form of the filter bag.

In the drawings, the numeral 2 designates the body of a filter casing, which is shown in Fig. 1 as being of the type described in my said application 569,082. The base portion of the casing has an inlet chamber 3, whose inlet port 4 is controlled by a suitable valve 5 seated in a valve casing 6. The base also has therein an outlet chamber 7 whose outlet port 8 is controlled by suitable valve 9 seated in a valve casing 11 at the opposite side of the base from the valve casing 6. The two chambers 3 and 7 are separated from each other by the partition wall 12, and the top of the chamber 3 is formed by a horizontal wall 13 having therethrough an opening 14 communicating with the filter chamber 15. This chamber 15 has a bottom opening 16 communicating with the outlet chamber 7.

17 designates an open cylinder having a reduced lower end portion 17$^a$ which seats within the opening 14. This cylinder has a plurality of slots or openings 18 which communicate with the chamber 15.

19 designates a valve member, which is arranged to seat partially within and to close the lower end of the cylinder 17. This valve member is carried by a vertically movable stem 20, which extends upwardly through the cylinder 16 and through a bearing in the top 21 at the upper end of the cylinder, and has a button or handle 22 at its upper end. This button or handle preferably has a projection 23, which is engaged by a recess 24 in the under side of the removable cover 25 of the chamber 15.

The filter element or bag is formed and seated around the cylinder 17. In the forms shown in Figs. 1, 4 and 5, this bag is formed from a cylinder of fabric, open at its ends, its lower end being fastened as indicated at 26 around the cylinder 17 just above supporting arms 27 secured to said cylinder. A bottom ring 28, which is preferably of slightly greater diameter than the internal chamber of the fabric cylinder is then dropped within the cylinder, after which the fabric is gathered inwardly around said ring and is then passed upwardly through a ring 29 above the ring 28 and of smaller diameter than the ring 28, and thence upwardly and around another ring 28 placed above the lower one. In this manner the fabric cylinder is woven back and forth between the alternating rings 28 and 29 until a filter element or bag of the desired length and capacity is formed. The upper end of the fabric cylinder is then gathered together and tied around the valve stem 20, as shown at 31 in Fig. 1. The members 30 in addition to carrying the forming rings 29, also serve as spacers and supports for the series of accordion-like folds of the bag and maintain such folds in their proper spaced relation. The inner rings 29 form part of spacers or formers 30, such as shown in detail in Figs. 2 and 3. Each of these spacers and formers consist of one of the inner rings 29, composed of one or more strands of wire and two outer rings 29$^a$ spaced vertically from each other, one above and one below the plane of the ring 29. The two outer rings 29ᵃ have suitable vertical spacers 29ᵇ, and the inner and outer rings are also connected by a series of tie wires 29ᶜ. The liquid to be filtered flows upwardly from the inlet chamber 3 into the cylinder 17, and thence through the slots 18 into the filter bag and through the same into the chamber 15, and thence downwardly to the outlet chamber 7.

In the manner described for forming the filter bag or element, it will be seen that a very large area of filtering surface is obtained, the filtering area being in fact very much greater than the area of the surrounding casing. When it is desired to remove the filter bag to be cleaned, or renewed, the cover 25 is first removed. The valve 19 is then raised by means of the handle or button 22 to bring the valve member 19 to its seat at the lower end 17ᵃ of the cylinder 17, and thus prevent the contents of the filter bag from falling through into the inlet chamber when the bag is lifted. As soon as the valve 19 comes into seating engagement with the cylinder 14, it has a lifting action on the filter element as a whole, including the central pipe or filter support, which can then be removed as a unit from the chamber 15. This operation can be very quickly and readily effected, the inlet valve for the chamber 3 being of course closed.

32 designates a connection for a flush pipe, and 33 designate drainage connections, thus providing for full flushing and cleaning of the interior of the casing.

The modification shown in Fig. 6 differs mainly from that shown in the other figures, in that the filter bag 34 is formed of two layers of fabric instead of a single layer. In forming this bag, the fabric cylinder is turned inside out for half its length, the bottom edge being drawn up through to the open top, and a ring 35 being pushed in between the two layers. The two layers are then woven back and forth between a series of rings 35ᵃ and inner rings 36, as in the form first described. The rings 36 form part of formers and supports 37, which are generally similar to those first described.

It will be obvious that my invention is not limited to the particular way in which these formers and supports are constructed, but that these may be made in various ways for use in connection with the series of outer rings so as to give the bag the desired shape and properly support the folds thereof.

What I claim is:—

1. A filter element comprising a fabric bag or cylinder woven in and out over two sets of rings of different diameters to form a series of accordion-like folds, one set of said rings having spacing and supporting means extending between adjacent folds and an interior inlet member within the fabric bag or cylinder, substantially as described.

2. A filter element comprising a fabric bag or cylinder woven in and out over two sets of rings of different diameters and forming a series of accordion-like folds, one set of said rings consisting of cage-like members which act as spacers and supports for the series of folds together with an inlet member extending interiorly of the fabric bag or cylinder, substantially as described.

3. A filter comprising a central perforated pipe member having an inlet opening at one end portion, a filtering element surrounding said member, and a valve carried by said member and arranged to open and close the inlet opening thereof, substantially as described.

4. A filter comprising a central perforated pipe member, one end of said member having an inlet opening and forming a seat for a valve, a filtering element surrounding said pipe member, and a valve adapted to control said opening, the stem of said valve extending outwardly through said pipe member, substantially as described.

5. In a filter, the combination with a filter chamber having an opening in its bottom wall, of a perforated central member removably secured in said opening, a filtering element surrounding said central member, a valve carried by said central member and arranged to close the lower end of said member, said valve and its stem forming lifting means, whereby said central member and the filter element may be removed from the chamber as a unit, substantially as described.

In testimony whereof, I have hereunto set my hand.

WILLIAM S. ELLIOTT.

Witnesses:
A. F. TIBBETTS,
H. M. CORWIN.